United States Patent [19]

Coxon et al.

[11] 4,201,192

[45] May 6, 1980

[54] SOLAR HEAT AIR SYSTEM

[75] Inventors: DeWayne A. Coxon; Timothy P. Gates, both of Cedar Springs, Mich.

[73] Assignee: Jordan College, Cedar Springs, Mich.

[21] Appl. No.: 866,545

[22] Filed: Jan. 3, 1978

[51] Int. Cl.² ............................................. F24J 3/02
[52] U.S. Cl. .................................... 126/422; 126/429; 126/430
[58] Field of Search ............... 126/270, 271, 400, 452, 126/436, 422, 428, 429, 430; 237/1 A

[56] References Cited

U.S. PATENT DOCUMENTS

| 3,997,108 | 12/1976 | Mason | 126/270 X |
| 4,012,920 | 3/1977 | Kirschbaum | 126/400 X |
| 4,029,081 | 6/1977 | Strong | 126/270 |
| 4,051,999 | 10/1977 | Granger et al. | 126/400 X |
| 4,060,195 | 11/1977 | Rapp, Jr. et al. | 126/270 X |
| 4,061,267 | 12/1977 | Lof | 126/270 X |
| 4,069,971 | 1/1978 | Swanson | 126/400 X |
| 4,081,024 | 3/1978 | Rush et al. | 126/270 X |
| 4,095,584 | 6/1978 | Pies | 237/1 A X |
| 4,124,061 | 11/1978 | Mitchell et al. | 126/400 X |

*Primary Examiner*—Carroll B. Dority, Jr.
*Assistant Examiner*—Randall L. Green
*Attorney, Agent, or Firm*—Price, Heneveld, Huizenga & Cooper

[57] ABSTRACT

A forced air, solar heating system employing dual air movers and dampers, such air movers being selectively operable in tandem or separately, in conjunction with a solar collector and a storage unit for heating a space. The air movers and dampers are operable to transfer heat from the collector to storage, or from the collector to the space, or from storage to the space, or in special fashion from both the collector and the storage to the space, for efficient heat salvage.

4 Claims, 8 Drawing Figures

SOLAR HEAT AIR SYSTEM

BACKGROUND OF THE INVENTION

This invention relates to solar energy heating systems.

Significant technological progress has been made in solar heating systems in recent years, following the realization of limits on fossil fuels and the rapidly increasing cost thereof. Solar heating is becoming a practical reality in some geographical areas, particularly in the southern and southwestern parts of the United States, sometimes designated the "Sun Belt". In the more northern regions, as in the northwestern, midwestern, and northeastern parts of the United States, where the number of sunny days is less, there is difficulty justifying the installation cost of solar equipment because of the considerably lower efficiency thereof. There are many cloudy or partly cloudy days when the collector cannot generate sufficient heat to meet requirements, particularly during cool mornings and evenings. Hence, any solar system of the presently known type is typically inactivated at such times, with the heat then being generated by fossil fuel combustion. Unfortunately, these same regions of cooler climate are more in need of whatever solar energy there is available, even if insufficient to meet the total heat requirements.

SUMMARY OF THE INVENTION

The present invention employs dual air movers, one between the solar collector and the heat storage, and the second between the heat storage and the space to be heated, both selectively operable to be operated individually or simultaneously in tandem, coupled with flow control dampers, and with return ducts from said space to said storage and to said collector, so that flow conditions from collector to storage and from storage to environmental space can be optimized, and so that any available heat at the collector can be salvaged while the space is being mainly heated from storage.

DESCRIPTION OF THE PREFERRED EMBODIMENT

Figure 1:
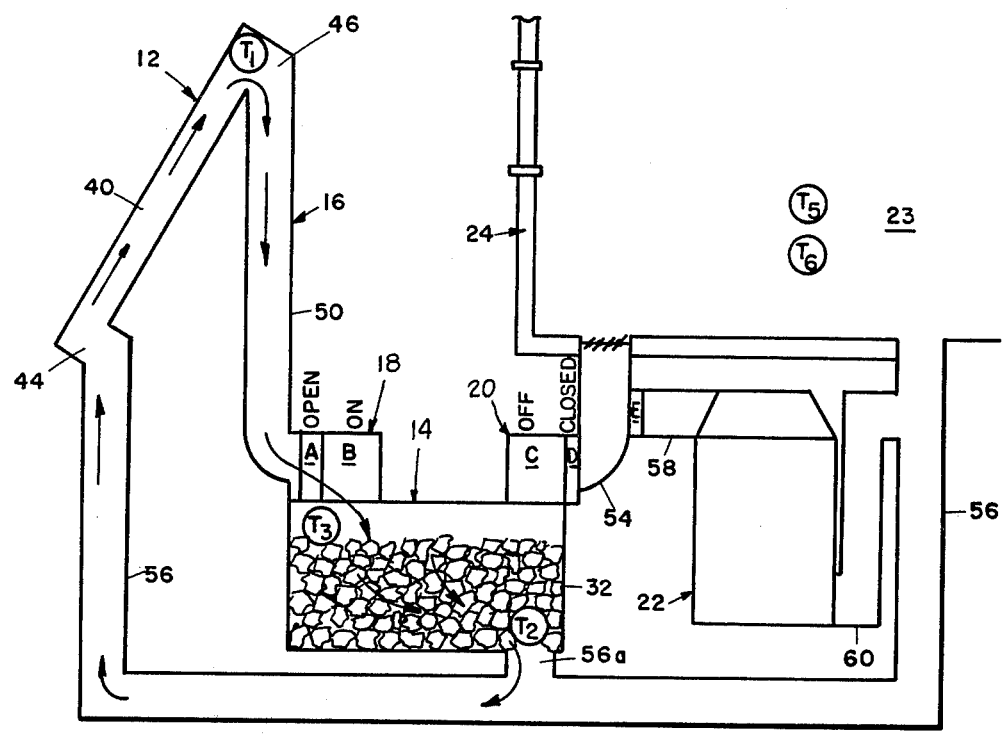
FIG. 1 is a schematic view of a solar collection system employing this invention, depicting the system in the mode wherein heat is transferred from the collector to storage.

Referring now specifically to the drawings, the solar heat system 10 depicted includes a solar collector 12, a storage unit 14, a duct system 16, dual air moving subassemblies 18 and 20, and optionally an auxiliary heat supply unit 22, to provide heat flow to the environmental space 23 within enclosure 24.

Environmental space 23 may be any of a variety of possibilities, including living quarters, school rooms, office or other commercial space, industrial area or otherwise.

The auxiliary heat supply subassembly 22 is optional, and may take a variety of forms, such as a fossil fuel combustion unit for burning coal, gas, oil or the like, or alternatively some other type of heat source such as a heat pump or electrical resistance unit.

Storage unit 14 comprises a heat sink, typically formed by retaining large rocks or the like in an enclosure or container, preferably below ground level and/or in a basement, and preferably well insulated. The unit has an air space above the heat sink material, and air flow passages between the rocks, bricks or other elements forming the heat sink. In this system, the air space 34 above the level of rocks 30 in container 32 effects controlled flow through the storage container without passage between the rocks under some conditions.

The collector assembly 12 may assume a variety of different forms, configurations, and materials, there being many in the art to choose from. Typically, it will include a transparent or at least translucent cover 40 for passage of sunlight into the assembly to an underlying light absorbant darkened surface or surfaces 42, with an air flow space therebetween for removal of absorbed heat energy. The unit is oriented at an acute angle to the vertical for an optimum position relative to the projected sunlight, this angle being dependent upon the latitude involved. It has an air flow inlet means 44 normally at the lower end, and air flow outlet means 46 normally at the upper end of the collector. Collector 12 is placed on the roof or the like for optimum exposure to sunlight.

Solar collectors and heat sinks are well known. The present system is believed unique in the cooperative arrangement made between these standard components and a particular dual air mover, damper, and duct arrangement controlled to take advantage of available heat from the sun under marginal heat supply conditions.

The first air mover subassembly 18 basically comprises a blower or impeller B with its outlet directed into the space at the top of the storage heat chamber at one end thereof, and a motor operated damper A adjacent blower B, preferably upstream thereof, forming a flow control valve in conjunction with blower B. This blower and damper arrangement are located in duct 50 which extends from outlet 46 of collector 12 to the top of the storage.

A second air mover subassembly 20 has a blower or impeller C and a motorized damper D associated therewith, blower C having its inlet communicant with the top of the storage unit, spaced from blower B and normally at the opposite end of the storage unit therefrom. Damper D operates in conjunction with blower C, the two being in duct 54 which extends from the storage chamber to the enclosure 24 and specifically to the environmental space 23 to be heated.

Blowers B and C both communicate with the space 34 in the top of the storage chamber, forming a passage. These blowers may vary in type but are preferably squirrel cage blowers or impellers. A variable drive connection is between blower C and its motor to allow the output of blower C to be adjusted for the particular ductwork so that its output is basically comparable to that of blower B.

Each of dampers A and D is so set up relative to the adjacent blower motor that the blower motor will be activated only when the damper is at least part way open. Further, each damper has control circuitry that shuts off the damper motor when the damper is fully opened and when the damper is fully closed.

Duct 56 constitutes a cold air return duct extending from the environmental space, having an outlet 56a into the lower portion of the storage chamber, and also communicant with inlet 44 on collector 12.

Auxiliary heater 22 includes duct 58 from the heater through damper E to space 23 as through duct 54. Damper E is pressure responsive and normally closed. It will open by positive pressure air flow from the activated auxiliary heater. The return duct 50 for this heater, may, as shown, extend from duct 56.

The blowers and dampers are controlled in response to a plurality of temperature sensors T1, T2, T3, T5, and optionally T6 for heater 22. Sensor location T1 is at the upper end of the solar collector, i.e. at the highest energy or highest temperature location thereof. It would include two separate sensor elements T1 and T1', one preset for a differential thermostat 66 and the other for part of a three gate circuit to be described. Sensor T2 is located at the lower temperature, i.e. lowest energy level zone of the storage unit which is normally near the bottom. Sensor T3 is located at the top of the heat storage medium in the storage chamber, preferably in space 34, to be at the highest energy zone of the storage. Sensor T5 is located in the environmental space 23. A second sensor T6 may be located in space 23 to detect a lower temperature than that to which sensor T5 is responsive, and associated with the auxiliary heater 22 to activate it in the event that heat from the solar system does not supply the requirements of space 23. Sensors T1 and T2 control the differential thermostat 66 of conventional type, e.g. such as that manufactured under the trademark "Honeywell" or "Rho Sigma". The thermostatic control effect of each sensor can be adjusted to occur at a particular preset temperature value for the desired effect. Sensor T1, for example, would typically be set at about 80° F., sensor T1' at about 140° F., sensor T2 at about 80° F., sensor T3 at about 90° F., sensor T5 at about 70° F., and sensor T6 at about 68° F.

Figure 1A:
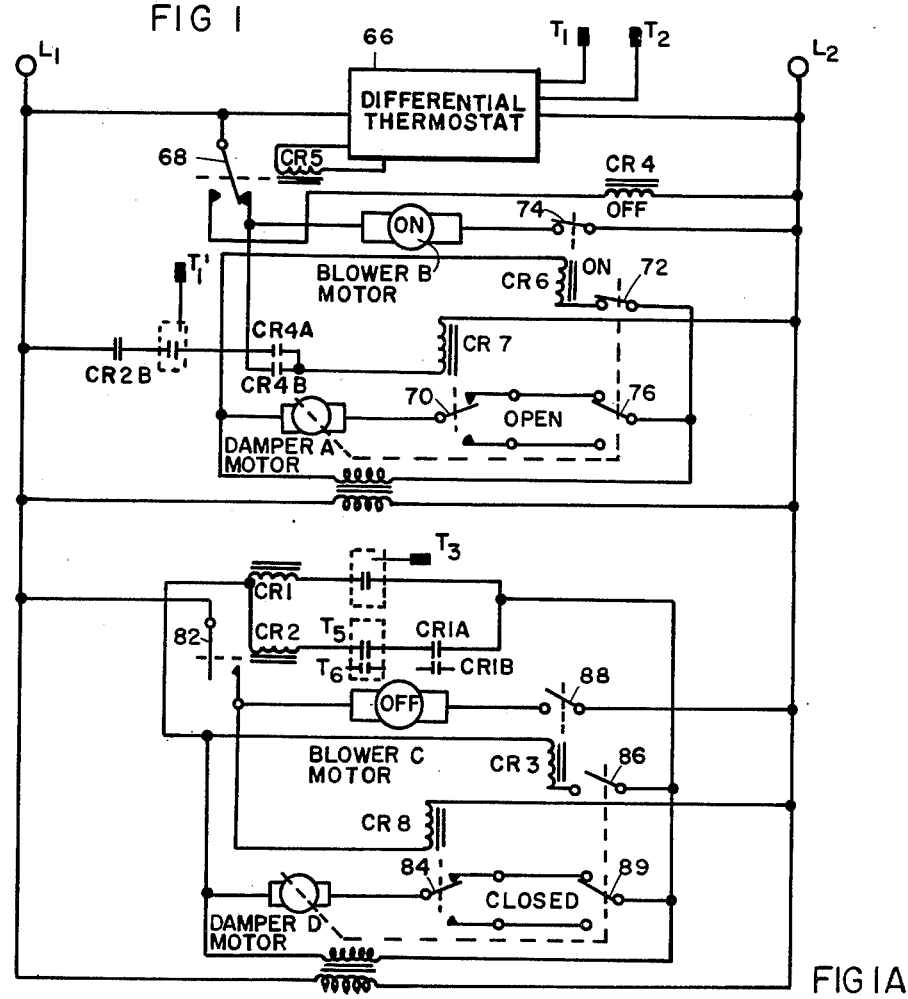
FIG. 1a is an electrical schematic diagram of the control circuit showing the condition of the components for the mode of operation depicted in FIG. 1.

In the first mode of the system depicted in FIG. 1 and using the controls as set forth in FIG. 1a, heat is caused to be exchanged from the collector to the storage by recirculatory air which is heated by passage through the solar collector. The flow is from the collector through duct 50, through open damper A, through operating blower B which propels the air into the top of the storage at one end and out the bottom of the storage at port 56a, such that flow of the heated air through the heat sink medium or rocks discharges heat to the rocks. The cooler air returns through conduit 56 back to inlet 44 of collector 12 for recirculation. In this mode, blower C is off or inactive and damper D is closed, thereby preventing air flow to space 23. To cause this first mode of operation to occur as generally described, the controls set forth in FIG. 1a operate as follows.

In this first mode of operation, the temperature at sensor T1 is greater than that at sensor T2. The differential thermostat 66 is programmed to close a circuit when T1 is greater than T2, to energize relay CR5. In this first mode, it senses that difference in temperature and energizes relay CR5. Relay CR5 operates switch 68 (to the right as depicted) to connect one side L1 of the power lines of the 115 volt circuit to one side of the blower B motor. Power is also applied through normally closed contacts CR4B to complete the circuit through relay CR7. Relay contacts CR4A are de-energized. Relay CR7 lifts (as depicted in FIG. 1a) to close switch contacts 70 which starts the motor of damper A opening. When damper A is part way open, switch 72 is positioned to be closed, which activates relay CR6. This closes normally open switch 74 to energize the motor for blower B. Thus, blower B is prevented from being activated until the damper is at least part way open. When damper A is all the way open, switch 76 is positioned to be shifted down to its lower position which breaks the circuit to the motor for damper A to stop it in this second position. With blower B activated and damper A open, blower B pulls air out of the collector, propels it through the storage, out its lower exit, and back to the collector. The motors in the lower part of the circuitry depicted are not operative during this mode. If temperature sensor T3, preferably a remote bulb thermostat placed at the top of the storage rocks in free air space 34, registers a low temperature below a preset valve, e.g. 80° F., it indicates no available energy in the storage or the collector. If the storage did have energy in it, this sensor would be heated above this preset minimum by natural convection. If the collector had energy, hot air would be flowing past sensor T3 because of blower B. If sensor T3 does in fact sense a higher temperature above this minimum, its contacts close to energize relay CR1, which opens contacts CR1B to auxiliary furnace 22 and closes contacts CR1A. But nothing happens unless sensor T5 of the space thermostat also calls for heat by closing its contacts in response to a low room temperature, e.g. below a preset minimum such as 70° F. A second thermostat sensor T6 in space 23 is preset to close contacts CR1B in series with sensor T6 if the temperature falls below a second minimum temperature, e.g. 68° F., so that if the solar energy is not available, the auxiliary heater will be activated, but when solar energy does become available as detected by sensor T3, it will disable the auxiliary system.

Figure 2:
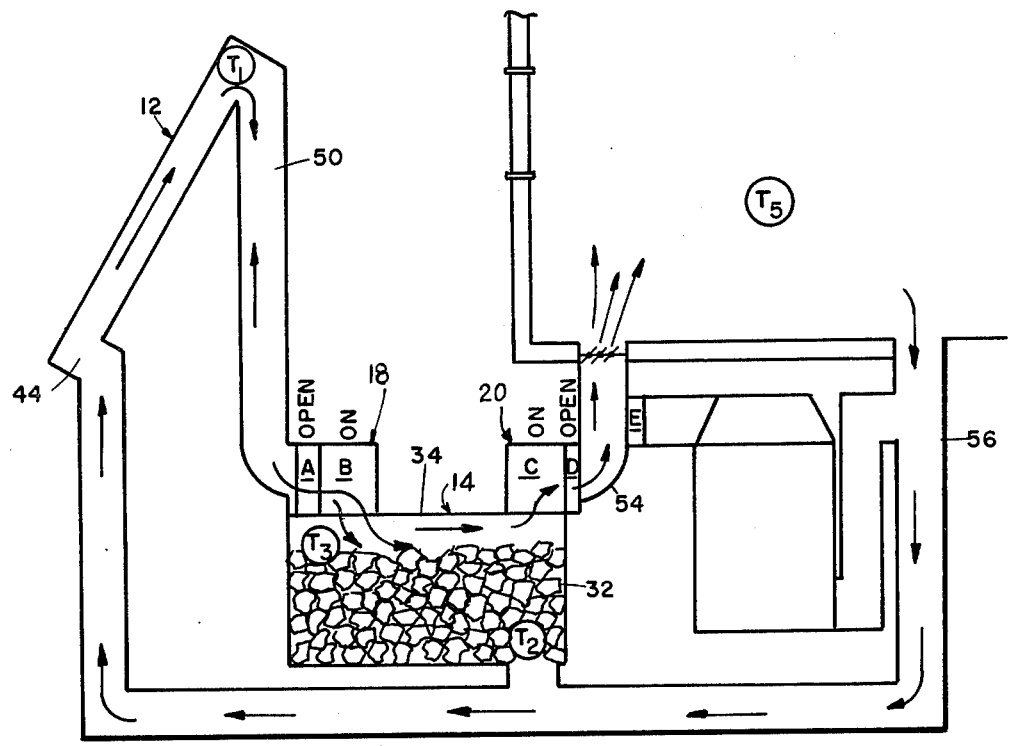
FIG. 2 is a schematic diagram of the system in FIG. 1, but in a second mode wherein heat is transferred from the collector to the environmental space to be heated.
Figure 2A:
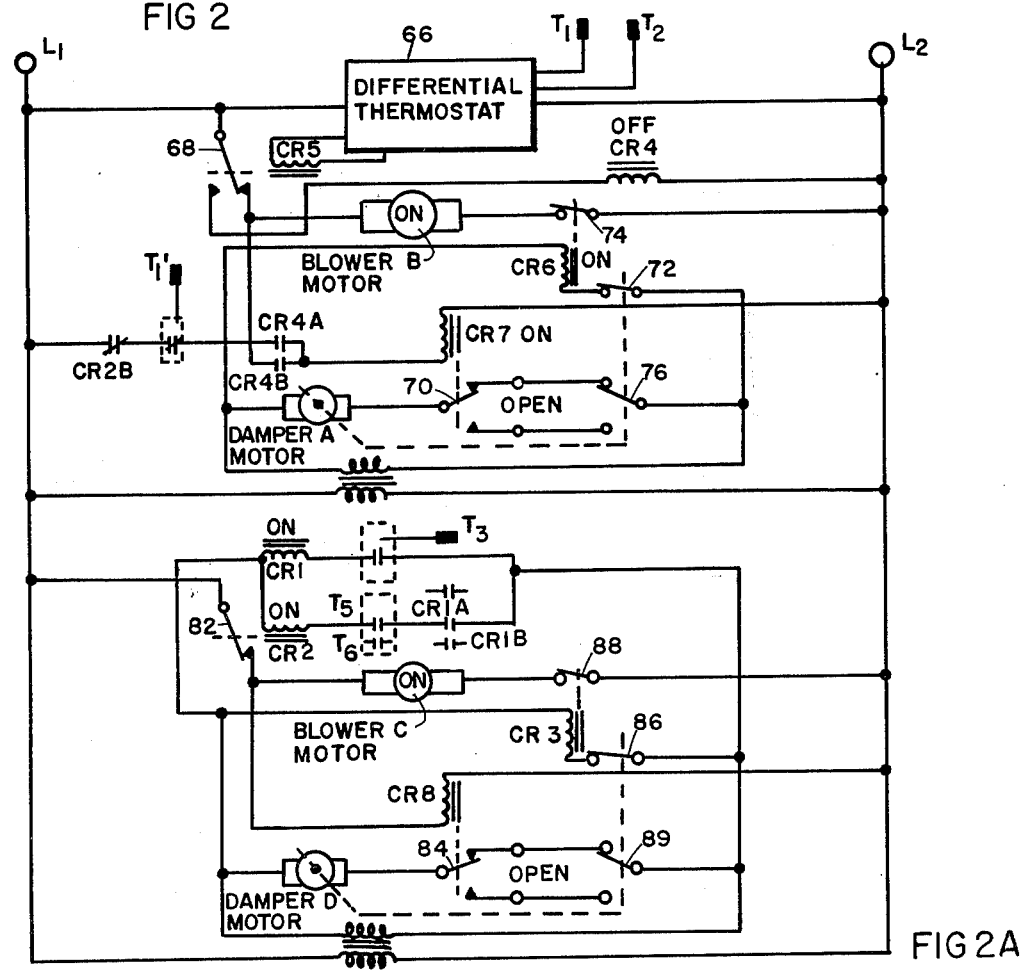
FIG. 2a is an electrical circuit diagram of the circuit in FIG. 1a, shown in the condition for the second mode depicted in FIG. 2.

In the second mode depicted in FIG. 2, heat is transferred from the collector to the environmental space. More specifically, the heated air flows from collector 12 through duct 50, through open damper A, propelled by operating blower B, across the air space 34 above the rocks in the storage chamber, into operating blower C, through open damper D, and through duct 54 to the environmental space. Return flow is through duct 56 back to inlet 44 of collector 12.

With the novel system, blower B is selected with a capacity to effect optimum air flow through the collector and storage during the first mode previously described. Blower C is selected to have a capacity necessary to cause air flow through the collector equal to air flow to the environmental space. In other words, blower C preferably will propel the same amount of air supplied by blower B. Any excess propulsion by blower C above that of blower B would cause some air to be drawn up through the storage medium by blower C. Any deficiency of blower C below the capabilities of blower B would cause blower B to propel some of its excess air down through the storage medium. Thus, for the two most important modes of operation, i.e. collector to house and collector to storage, the air propulsion can readily be optimized with this novel system.

If temperature sensor T3 detects sufficient energy from the collector, i.e. air at a high enough temperature, to supply requirements of space 23, sensor T3 contacts close to energize relay CR1 which closes normally open contacts CR1A. And, if the space thermostat T5 is also calling for energy, then a completed path of current flow for relay CR2 is formed. Relay CR2 closes switch 82 which activates relay CR8 which in turn closes normally open switch 84 to start damper D motor. When damper D passes the partially open position, it closes switch 86 which activates relay CR3 to close switch 88 in series with the blower C motor. Thus, with damper D open and blower C active, air deposited by blower B is drawn off air space 34 and propelled into environmental space 23. When the damper and its rotary solenoid motor are all the way open, switch 89 is lowered to open so that damper D motor stops.

Figure 3:
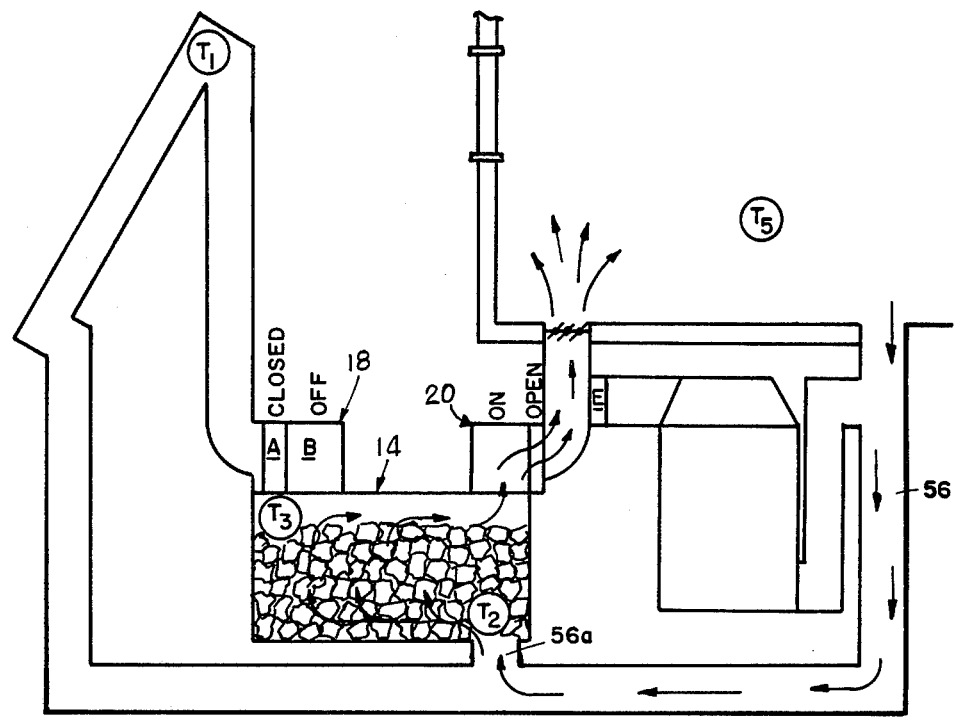
FIG. 3 is a schematic diagram of the system in FIGS. 1 and 2, but in the third mode wherein heat is transferred from the storage to the environmental space.

In the third mode of operation, FIG. 3, heat is removed from storage and transferred to the environmental space with blower C being active and damper D open, but blower B being inactive and damper A closed. In this mode, air is drawn up through the rocks in the storage chamber to blower C, through damper D and duct 54 to space 23. Return air for recirculation is through duct 56 to bottom port 56a to the storage chamber.

Figure 3A:
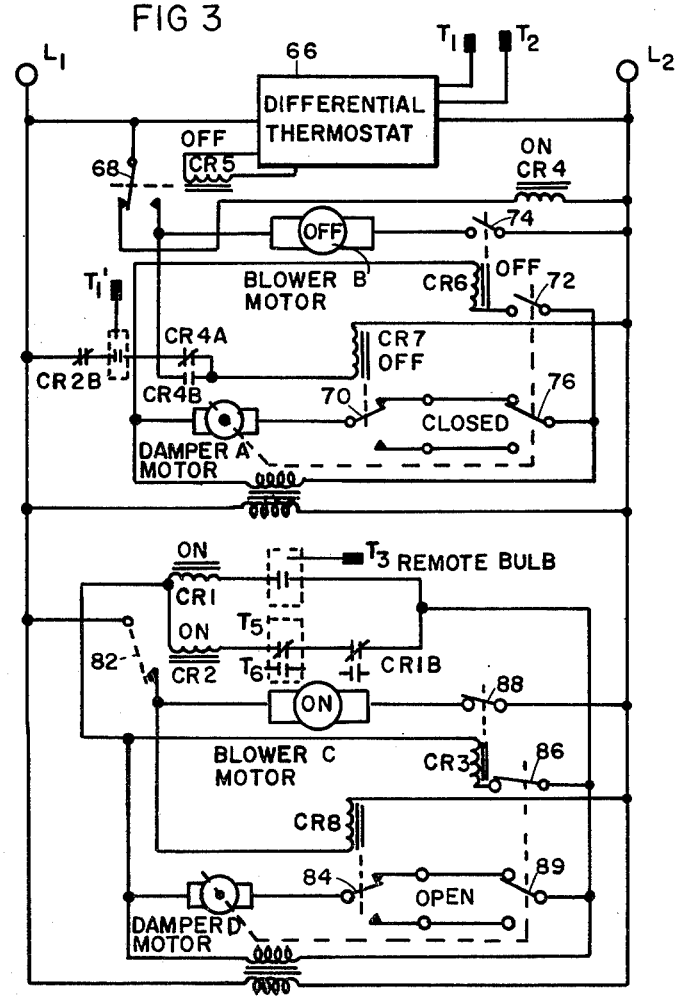
FIG. 3a is the electrical circuit diagram of the circuit in the condition for causing the third mode of operation depicted in FIG. 3.
Figure 4:
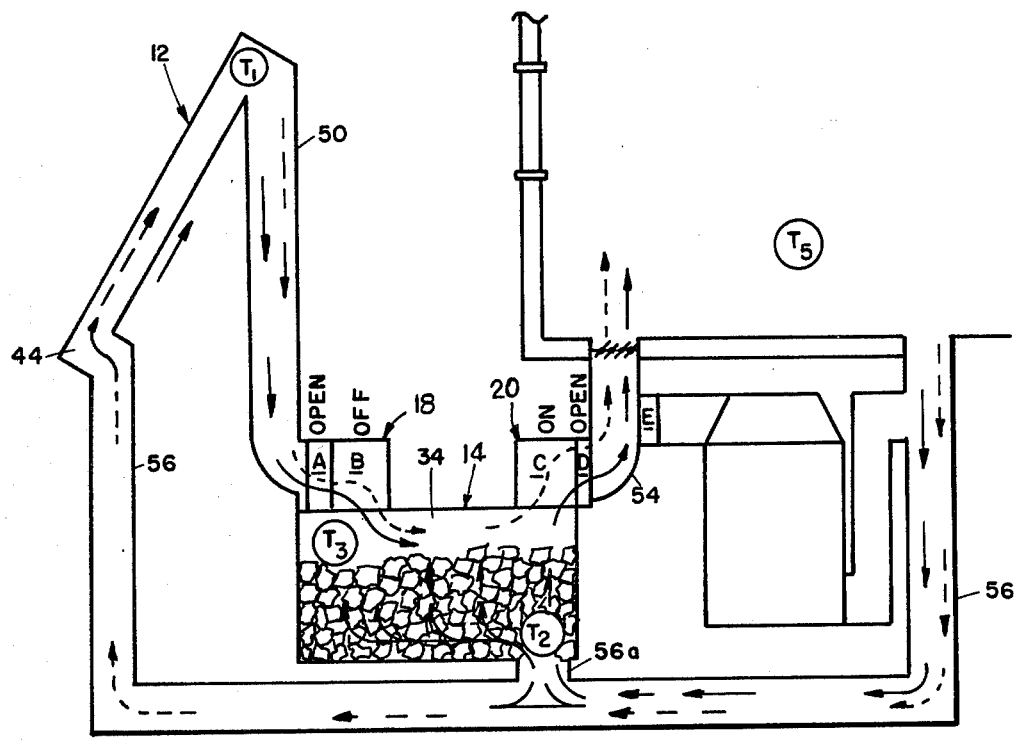
FIG. 4 is a schematic diagram of the system in FIGS. 1–3, but in a fourth mode with heat transferred simultaneously from the collector and also from the storage to the environmental space.
Figure 4A:
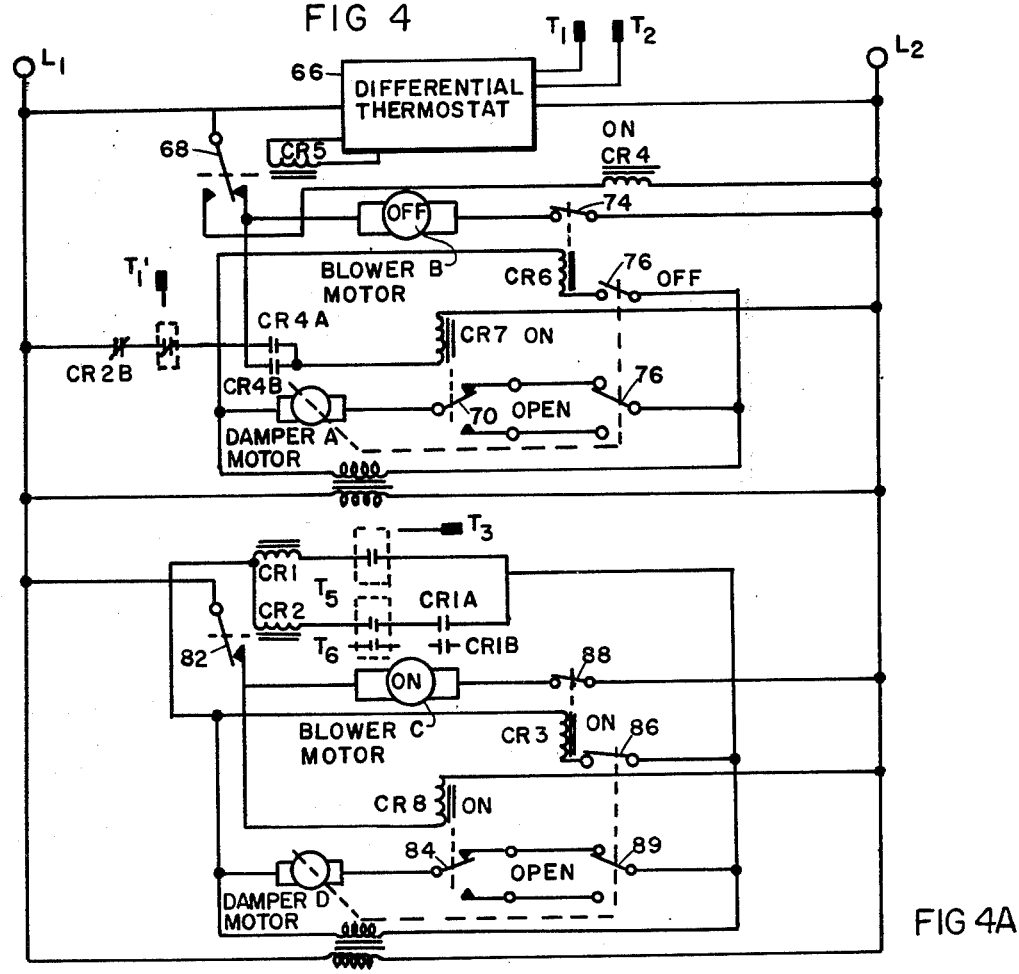
FIG. 4a is the circuit diagram shown in the condition to cause the fourth mode of operation depicted in FIG. 4.

This third mode occurs when the collector does not have energy to supply the space, but storage does. Temperature at sensor T2 at the cold side of storage will probably in this condition be equal to or greater than the temperature at sensor T1. Thus, relay CR5 is de-energized with switch 68 in its relaxed position, (to the left as depicted in FIG. 3a). This allows the 115 volt potential to be applied to alternate relay CR4. This causes the normally closed contacts CR4B to open, and closes normally open contacts CR4A. To have power applied to relay CR7 to activate damper A motor, additional connections must be made. Specifically, contacts of CR2B and thermostat contacts of sensor T1 will also have to be closed. The contacts of thermostat T1 are normally open and will close when the solar collector temperature drops. Contacts CR2B will close when relay CR2 is actuated. This occurs when space 23 calls for heat to close thermostat contacts of sensor T5 and contacts CR1A are closed with actuation of relay CR1 as sensor T3 contacts close responsive to heat supply in storage. Under these conditions, power is applied to relay CR8 to close normally open switch 84, and thereby operate damper D motor. When the damper motor gets part way open, switch 86 in series with relay CR3 is closed to energize relay CR3, thereby closing switch 88 to turn the blower C motor on. When the damper motor is all the way open, switch 89 is shifted down so that damper D motor stops. Later, when relay CR8 relaxes contacts 84, the normally closed contacts close again to operate the damper D motor back to the closed position automatically. Thus, if at any time the solar energy supply fails, the dampers automatically close to seal off the system and prevent reverse cycling.

With blower C active and damper D open, and the collector branch of the system closed, air can only be pulled up through storage to space 23. When the storage runs out of energy, then sensor T3 will cool and open its contacts, causing relay CR1 to de-energize, opening normally open contacts CR1A. That shuts off relay CR2 and blower C immediately shuts off, removing power from relay CR8 to relax switch 84. In the meantime, switch 89 has lowered to the lowermost depicted position. Hence, damper D motor turns on and drives the damper closed. When it is almost closed, it opens switch 89 to deactivate the damper D motor.

In the fourth mode, the system uniquely causes heat to be taken from storage while simultaneously salvaging any available heat from the collector, both being projected into the environmental space. More specifically, even though the amount of heat in the collector is not sufficient to meet the requirements of space 23, if there is some heat available, it is salvaged. This typically would occur on partly cloudy days, in the morning, or in the evening. Dampers A and D are both open, with blower B being inactive but allowing flow of air through its housing, but blower C being active and operating. Thus, blower C impels flow of air out of the storage chamber and through open damper D and duct 54 to the environmental space. This air out of the top of the storage area comes mostly from up through the rocks because of return air in duct 56 passing through port 56a. In addition some air flow is across the top of the rocks because of air being slowly drawn from the collector 12 through duct 50, open damper A and inactive blower B by natural convection and some effect of the blower C. This air flows through space 34 above the rocks in storage, through propelling blower C, damper D and duct 54 to space 23. Return of a correspondingly small amount of air to the collector is also via duct 56 to inlet 44. The amount of air that actually flows through the collector is much less in this mode than when air is forced by blower B through the collector. Further, the flow through the collector is considerably less than through the storage rocks, but the smaller flow will salvage the heat that is being collected even though not sufficient for supplying all requirements. This slower rate of flow will continue until no heat is left in the collector as sensed by sensor T1, in which event damper A is closed, or until considerably more heat becomes available in the collector, in which event blower B is activated, or until space 23 does not call for more heat, in which event damper D closes.

The functioning of the upper half of the circuitry in this fourth mode is basically comparable to that in the third mode. That is because the flow of air occurring in the third mode would be occurring also in this mode, and in addition the open damper A allows salvaging of heat from the collector. Thus, sensor T3, typically a remote bulb, would have sensed energy in the storage and energized relay CR1 so that actuation of its contacts along with the room thermostat T5 would energize relay CR2. This would feed energy to relay CR8 which would open damper A. When it is part way open, it closes contacts 86 in series with relay CR3, energizing the blower C motor as in the third mode. In this mode, however, in addition, remote thermostat T1 adjusted to a minimum usable temperature from the collector, e.g. 75° F. or 80° F., when satisfied, as in the morning or evening when the sun is out but the collector has not received sufficient energy to produce all requirements of space 23, will cause contacts CR1A to close. If then space 23 is calling for heat, energizing relay CR2, this closes normally open contacts CR2B on the differential thermostat. Also, remote bulb controller T1' set at the minimum usable temperature and having its contacts closed, plus the CR4A contacts being closed because of the differential thermostat being dissatisifed, causes this three element "and" circuit to be completed. That operates relay CR7, closing the CR7 contacts and opening the damper A motor contacts. When damper A is being opened and is part way open, the contacts 72 in series with relay CR6 close to activate relay CR6 to close contacts 74 and energize the blower B motor. However, in this fourth mode, the blower B motor cannot be turned on because it also has to have the switch 68 of relay CR5 closed (to the right as depicted), but it is not closed because the differential thermostat 66 is not calling for it. So basically the three "and" gates down at the contact CR2B (indicating a minimum usable temperature) bypass this and operate just the damper A motor to open it. When damper A motor opens, and blower B still off, it allows the negative pressure created in air space 34 on top of the rock storage area to draw air from the collector to be added to the space. If then the temperature at sensor T1 builds up, the system will shift into the first mode as in FIG. 1. If the heat is all drawn off the collector to drop the temperature at sensor T1, then damper A is closed. If either of these occurs, the operation shifts into the other mode with no interruption. If and when the temperature at sensor T1 builds back up to the minimum usable temperature, the damper A will again reopen. Thus, there can be a pulsing action where the damper is repeatedly opened and closed as conditions dictate.

The system is uniquely adapted therefore, to salvage available heat from the collector and employ it effectively. The system is basically simple, taking advantage of the storage chamber for multiple air flow paths under the control and affect of dual air movers and affiliated dampers associated therewith.

The embodiments of the invention in which an exclusive property or privilege is claimed are defined as follows.

1. In a forced air solar heating system for an environmental space, including a solar collector having a high energy portion and a low energy portion and a heat storage unit having a high energy portion and a low energy portion and a heat storage medium;
   dual air mover and damper subassemblies including a first blower and a first damper associated therewith, and a second blower and a second damper associated therewith;
   a first duct means for conducting heated air from the high energy portion of said collector through said first blower and first damper to said storage unit high energy portion;
   a second duct means for conducting heated air from said storage unit high energy portion to said environmental space;
   third duct means for conducting air flow from said environmental space to said storage unit low energy portion and to said collector low energy portion; and thermostatic control circuit means associated with said collector high energy portion, said storage high energy portion, said storage low energy portion, and said environmental space, and connected with said first blower, first damper, second blower, and second damper, for causing selective air flow (a) from said collector to said storage and return, (b) from said storage to said environmental space and return, (c) from said collector to said environmental space and return and (d) from said collector and also through said storage medium to said environmental space and return to both.

2. The solar heating system in claim 1 wherein:
   said control circuit means opens said first damper, activates said blower, closes said second damper and inactivates said second blower for selective air flow (a); said control circuit means closes said first damper, inactivates said first blower, opens said second damper, and activates said second blower for selective air flow (b); said control circuit opens said first and second dampers and activates said first and second blowers for selective air flow (c); and said control circuit opens said first and second dampers, inactivates said first blower, and activates said second blower during selective air flow (d).

3. The solar heating system in claim 1 wherein during said selective air flow (c), said second blower has air movement capacity to remove air from storage unit at about the rate of which said first blower deposits air into said storage unit.

4. The solar heating system in claim 2 wherein, during said selective air flow (d), the air flow from said collector is significantly less than the air flow through said storage medium.

* * * * *